June 12, 1945.   C. F. BINKERT ET AL   2,377,849
PROCESS FOR BENDING GLASS
Filed Aug. 29, 1942   2 Sheets-Sheet 2

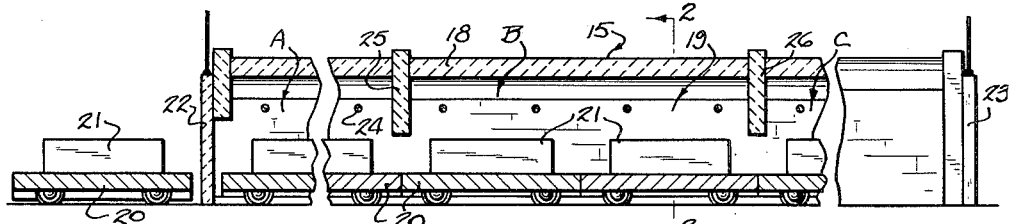
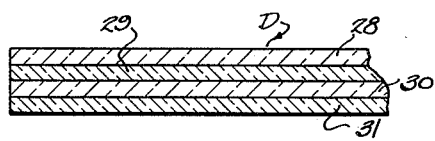
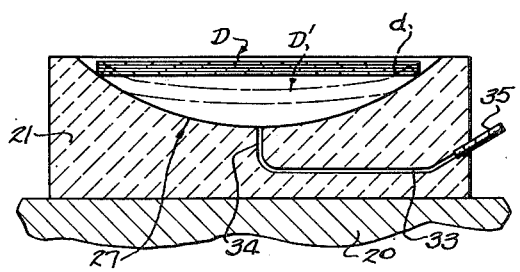
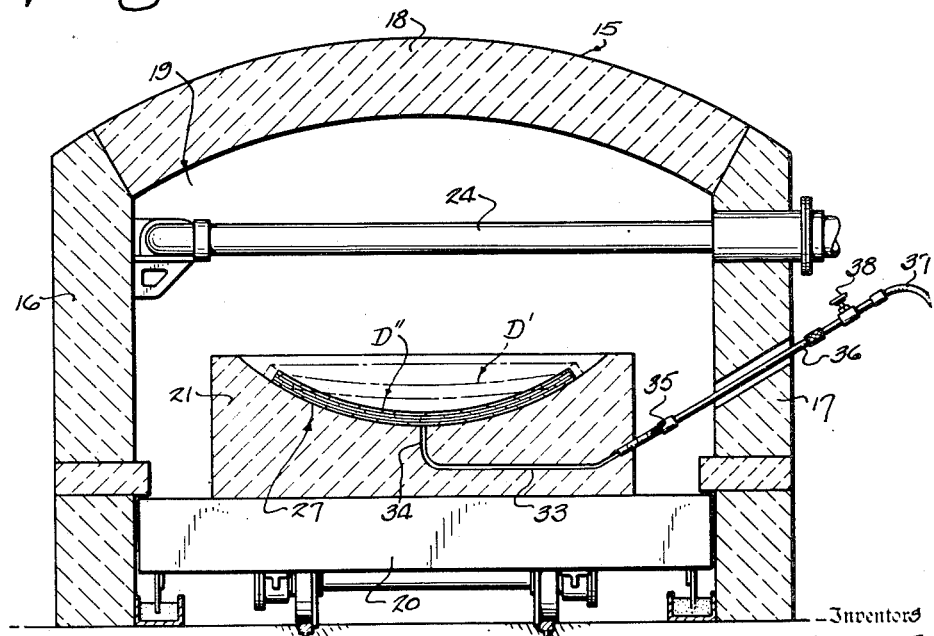

Inventors
CARL F. BINKERT,
JOSEPH E. JENDRISAK
By Frank Fraser
Attorney

Patented June 12, 1945

2,377,849

UNITED STATES PATENT OFFICE 2,377,849

PROCESS FOR BENDING GLASS

Carl F. Binkert, Toledo, and Joseph E. Jendrisak, Rossford, Ohio, assignors to Libbey-Owens-Ford Glass Company, Toledo, Ohio, a corporation of Ohio Application August 29, 1942, Serial No. 456,644

10 Claims. (Cl. 49—84)

The present invention relates to an improved process for bending glass sheets or plates and particularly for producing compound and/or spherical type bends.

While the process of this invention may be practiced in the bending of single sheets or plates of glass, it is of particular utility in bending glass sheets in pairs to be used in the manufacture of laminated safety glass.

Laminated safety glass ordinarily comprises two sheets of glass and an interposed layer of thermoplastic adherent thereto to provide a composite structure. One growing field of use for safety glass is in the glazing of openings in airplanes and other aircraft. Safety glass used in such installations usually includes a relatively thick plastic interlayer which has the advantage of increasing the resistance of the glass to shock as well as facilitating the mounting of the safety glass structure in those cases where the thick plastic interlayer extends beyond the edges of the glass sheets to provide a flexible attaching flange. By way of example only, it may be stated that two sheets of ⅛ inch plate glass have been laminated with a plastic interlayer also of ⅛ inch thickness.

Much of the safety glass used in airplanes is bent or curved and, in order to bend the glass sheets so that they will accurately fit one another when subsequently bonded to the plastic interlayer, it has been customary to interpose between the two glass sheets during bending a spacer having substantially the same thickness as the layer of plastic with which the glass sheets are to be subsequently bonded. This spacer has frequently consisted of a third sheet or light of glass which is discarded after the bending operation.

In bending the glass sheets, the said sheets are ordinarily laid directly one upon the other and supported horizontally upon a mold having a concave surface corresponding to the curvature to be given the sheets. The glass sheets and bending mold are then placed in a furnace and subjected to sufficient heat to cause the said sheets to become softened and to drop or settle down by their own weight into the mold and take the shape thereof.

There is at the present time an increasing demand, particularly in the aircraft industry, for sheets of laminated safety glass of spherical or spherical type conformation. That is, sheets which in shape are identical with or which closely approximate a portion of a sphere. However, prior to this invention, it has been exceedingly difficult to obtain spherical bends of accurate conformation due to a decided tendency for the glass to wrinkle around the edges thereof when it becomes softened, and to sink into the mold in much the same manner that a sheet of paper wrinkles when placed around a ball. Moreover, this difficulty is greatly increased when attempting to bend two or more sheets of glass simultaneously.

It is an object of this invention to provide an improved process of bending glass sheets either singly or in pairs which is of particular utility in the processing of spherical or spherical type bends.

Another object of the invention is the provision of an improved process of bending glass singly or in pairs to a spherical conformation in such a manner that the glass sheets will accurately conform to the shape of the mold and wherein wrinkling of the edges of the sheets will be avoided.

A further object of the invention is the provision of an improved process of bending glass sheets wherein the sheets are subjected first to an initial or prebending step by causing them to sink downwardly into the mold by gravity, after which the sheets are subjected to a second step by applying suction to effect the final bending thereof.

Other objects and advantages of the invention will become more apparent during the course of the following description, when taken in connection with the accompanying drawings.

In the drawings, wherein like numerals are employed to designate like parts throughout the same:

Fig. 1 is a vertical longitudinal sectional view through a continuous type of bending furnace which may be used in carrying out the invention;

Fig. 2 is a vertical transverse section through the furnace taken substantially on line 2—2 of Fig. 1;

Fig. 3 is a transverse sectional view through one of the bending molds;

Fig. 4 is a transverse section showing a plurality of glass sheets properly assembled for bending;

Fig. 5 is a transverse section through a sheet of laminated safety glass;

Figure 6:
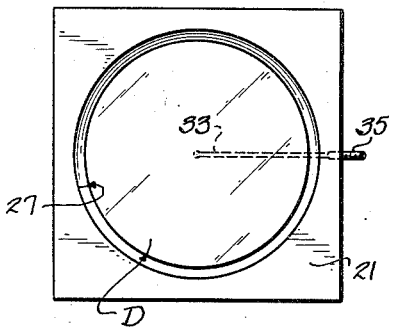
Fig. 6 is a plan view of one of the bending molds.

With reference now to the drawings and particularly to Figs. 1 and 2, the continuous bending furnace or oven 15 illustrated is of tunnel-like formation and of any desired length; said furnace comprising opposite side walls 16 and 17 and a crown 18 cooperating to form a substantially closed tunnel chamber 19 through which the cars or trucks 20 carrying the molds 21 and glass sheets to be bent can be passed in a substantially straight path, the opposite end of the tunnel chamber 18 being closed by vertically adjustable doors 22 and 23. The tunnel chamber can be heated in any desired manner, such as by means of the radiant heating tubes 24 extending transversely thereof above the path of travel of the cars. The said tunnel chamber may also be divided by baffles 25 and 26 into a plurality of substantially separate treating sections or zones A, B, and C respectively; the section A constituting the preheating zone, section B the bending zone, and section C the cooling or annealing zone.

Each mold 21 is preferably formed of a suitable ceramic or refractory material, although it may be of metal or other material if desired; said mold comprising a body portion having a concave bending surface 27 in the top thereof conforming to the curvature of the glass sheets to be bent. As shown in Fig. 4, four sheets of glass 28, 29, 30 and 31 are adapted to be bent simultaneously, although one or any number of sheets may be bent in accordance with the invention. In the embodiment illustrated, however, the two glass sheets 28 and 30 are adapted to be subsequently united with a sheet of plastic 32 (Fig. 5) to provide a sheet of laminated safety glass. In order to compensate for the thickness of the plastic interlayer 32 of the safety glass unit, there is provided a spacing sheet 29 between the two glass sheets 28 and 30 (Fig. 4) of a thickness substantially equal to that of the plastic interlayer. There is also preferably provided a bottom protecting sheet 31 to prevent the lower surface of the sheet 30 from being marred by the face of the mold. In practice, the four sheets are adapted to be bent simultaneously, after which the sheets 29 and 31 may be discarded and the sheets 28 and 30 bonded to an interposed layer of thermoplastic 32 to form a sheet of laminated safety glass (Fig 5).

In order to assure that the several glass sheets will not fuse to one another during bending, the inner surfaces of the said sheets may be coated with a suitable material which will prevent adherence therebetween when subjected to bending temperature. For example, such a coating may consist of a mixture of whiting and water, baking soda and water, or a water solution of finely divided diatomaceous earth.

It has also been discovered that the bending of the glass sheets in this manner can be facilitated by using a spacer sheet 29 and a bottom protecting sheet 31 formed of heat absorbing glass. This type of glass will take up heat relatively more quickly than the glass sheets 28 and 30 and will transmit heat to said sheets, resulting in a more uniform and accurate bending of all of the sheets.

In bending the glass sheets, they are first assembled with one another as shown in Fig. 4 to form the assembly D which is then placed upon the upper concave surface 27 of the mold 21 (Fig. 3). The mold is then passed successively through the preheating, bending, and cooling zones A, B and C respectively of the furnace 15. As the sheets are carried through the first part of the bending zone, they will be sufficiently heated to cause the said sheets to become softened and to drop or settle down by their own weight partially into the mold and take the shape indicated in broken line D' in Fig. 3. The prebending of the several sheets of glass in this manner results in the sheets becoming wedged down into the mold, by the bending of the edge portions thereof as at d, and not only seals the space between the edges of the sheets and the mold but also results in the several sheets being drawn down as though they were in effect only a single sheet when the lower sheet is acted upon by suction. After the glass sheets have been prebent, they are drawn down into the mold to take the shape thereof and effect the final bending by a suitable suction creating apparatus (not shown). To this end the body of the mold is provided with a horizontal opening 33 leading from one side of the mold to substantially the center thereof and terminating in an upturned end portion 34 communicating with the interior of the mold beneath the glass sheets. Suitably secured within the outer end of opening 33 is a fitting 35 to which is adapted to be attached a pipe 36 connected with the suction creating apparatus by a flexible tube 37 and having interposed therein a control valve 38.

Figure 7:
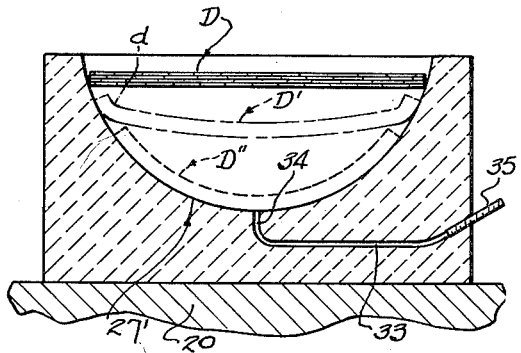
Fig. 7 is a transverse section through a bending mold used in the making of relatively deep spherical bends.
Figure 8:
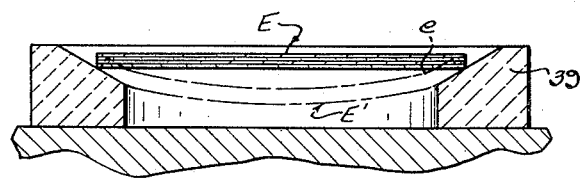
Fig. 8 is a transverse section through a ring mold which is used in prebending glass sheets having a compound spherical type bend.

The glass sheets, after having been prebent by gravity at one end of the zone B of the furnace, will pass toward the opposite end for the final bending. This final bending is accomplished by engaging the pipe 35 with the portable fitting 36 and then opening valve 38, whereupon the air will be withdrawn from the chamber beneath the glass sheets causing said sheets to be drawn downwardly into contact with the mold face as at D'' (Fig. 2). The molds shown in Figs. 2, 3 and 6 are intended for producing relatively shallow spherical type bends, while in Fig. 7 there is illustrated a type of mold of similar construction but with the concave bending surface 27' thereof shaped to effect the making of relatively deep spherical bends. Otherwise, the mold of Fig. 7 is the same as illustrated in Figs. 2, 3 and 6. In bending the glass sheets on this mold, they are first placed as indicated in full lines D and are subjected to the step of prebending as set forth above, which causes the edge portions of the sheets to bend as at d and the sheets to drop downwardly within the mold as indicated in broken lines at D'. As will be apparent, upon prebending, the sheets become wedged within the mold and form a seal around the edges thereof so that when acted upon by suction to effect the final bending, the sheets will be drawn downwardly as a unit to the position indicated at D'' to take the shape of the mold surface 27'. In applying suction to effect final bending, it has been found that the most satisfactory results can be obtained when a relatively high suction is applied to the sheets intermittently and for relatively short periods at a time.

As pointed out above it is important, when bending a plurality of glass sheets simultaneously, that the several sheets remain in substantial contact with one another during bending so that the assembly will bend as a unit or, in effect, like a single sheet. The glass sheets when assembled together as in Fig. 4 have a natural tendency to stick together and this tendency is increased by the wedging action resulting from the prebending of the sheets. However, it has been found that when suction is applied continuously to the stack of sheets over too long a period, the surface contact between the sheets may be broken and the bottom sheet drawn away from the others.

We have discovered that the possibility of breaking the surface contact between the sheets during final bending may be avoided by continuously turning the valve 38 on and off to alternately apply and cut off suction to the space beneath the glass sheets until the sheets have been drawn down as a unit into contact with the mold surface. It is desired to utilize as nearly a complete vacuum as possible for this purpose, but we have obtained very satisfactory results using a vacuum of between 22 inches and 30 inches, when applied and cut off for periods of approximately 15 seconds each.

Figure 9:
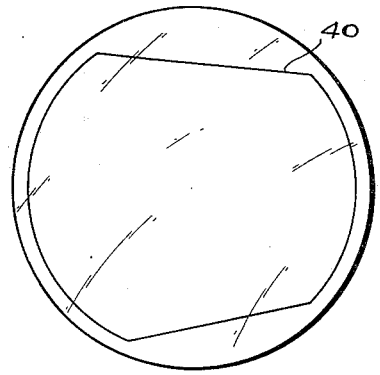
Fig. 9 is a plan view showing the manner in which the glass sheets, prebent on the mold shown in Fig. 8, may be cut after prebending.
Figure 10:
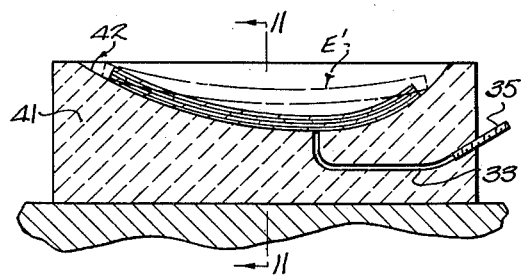
Fig. 10 is a transverse section through a mold showing the final bending of the cut sheets to form a compound spherical type bend.

Figs. 8, 9, 10 and 11 illustrate a process for making so-called compound spherical type bends; that is, bends which, while approximating a portion of a sphere, include at least two different radii in their make-up and which are non-circular in outline. This process is preferably carried out by first prebending an assembly E of circular sheets upon a ring mold 39 (Fig. 8) in a suitable furnace, to cause the several sheets to be wedged together as at e in the manner described above in connection with regular spherical bends. The mold 39 is then removed from the furnace, the prebent sheets are taken out of the mold, and sections 40 of the desired outline cut from the sheets as shown in Fig. 9. The prebent cut sheets are then placed in superimposed relationship upon a second mold 41 (Fig. 10), which is provided with a concave bending surface 42 conforming to the final shape to be given the glass sheets.

Figure 11:
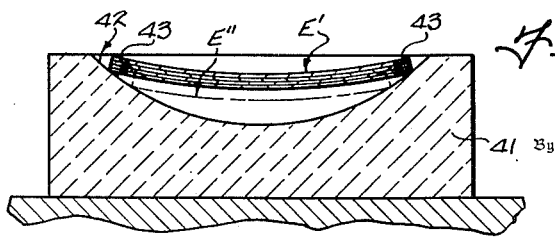
Fig. 11 is a vertical section taken substantially on the line 11—11 of Fig. 10.

Because the sections 40 are irregular in outline, the side edges 43 of the assembly E' of prebent, cut sheets will be out of contact with the bending surface 42 of the mold 41 as shown in Fig. 11. For this reason a second prebending of the glass sheets is required. The mold 41 is accordingly placed in a furnace and the stack of sheets are heated until they soften sufficiently to cause them to drop to the position shown at E'' (Fig. 11) and seal the space between the edges of the sheets and the mold face 42. Suction is then applied to the sheets at short intervals to cause them to be drawn downwardly as a unit into contact with the mold surface.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

We claim:

1. The method of bending glass sheets within a concave mold to produce a spherical type bend, comprising arranging the sheet to be bent upon the mold with the edges of the sheet entirely within the actual shaping area of the mold in contact with the bending surface and free to move thereover, prebending said sheet by heating to cause it to be softened and sink partially into the mold by gravity until the marginal portions of the sheet are in contact with the bending surface, and then applying suction to and drawing the entire prebent sheet downwardly into the mold.

2. The process of bending a plurality of glass sheets simultaneously within a concave mold to produce spherical type bends, comprising arranging the sheets to be bent in superimposed relationship upon the mold with the edges of the lowermost sheet entirely within the actual shaping area thereof in contact with the bending surface and free to move thereover, prebending said sheets by heating to cause them to be softened and sink partially into the mold by gravity until the space beneath the sheets is sealed and the sheets are wedged together, and then effecting final bending of the assembled sheets by exhausting the air from the space beneath the sheets and drawing the sheets downwardly as a unit into the mold.

3. The process of bending a plurality of glass sheets simultaneously within a concave mold to produce a spherical type bend, which comprises placing the sheets to be bent in superimposed relationship upon the mold with the edge of the lowermost sheet in contact with the bending surface, prebending said sheets by heating to cause them to be softened and sink partially into the mold by gravity, and then applying suction intermittently to the prebent sheets to draw them downwardly into the mold and effect final bending thereof.

4. The process of bending a plurality of glass sheets simultaneously within a concave mold to produce a spherical type bend, which comprises placing the sheets to be bent in superimposed relationship upon the mold with the edge of the lowermost sheet in contact with the bending surface, prebending said sheets by heating to cause them to be softened and sink partially into the mold by gravity to seal the space beneath the sheets and to wedge said sheets together, and then applying a high suction to the space beneath the sheets for short periods at short regular intervals to draw said sheets downwardly as a unit and effect final bending thereof.

5. The process of bending glass sheets in pairs within a concave mold to produce a spherical type bend for subsequent assembly with a plastic interlayer to form a sheet of laminated safety glass, which comprises assembling a pair of sheets to be bent with a spacer sheet of heat absorbing glass between said pair of sheets and a bottom protecting sheet of heat absorbing glass beneath said pair of sheets, arranging said assembled sheets upon a mold with the edges of the lowermost sheet entirely within the actual shaping area of the mold in contact with the bending surface and free to move thereover, prebending said sheets by heating to cause them to be softened and sink partially into the mold by gravity, until the space beneath the sheets is sealed and the assembled sheets are wedged together, and then effecting final bending of all of the sheets at the same time by applying suction to the lowermost sheet and drawing all of them downwardly as a unit into the mold.

6. The process of bending glass sheets in pairs within a concave mold to produce a spherical type bend for subsequent assembly with a plastic interlayer to form a sheet of laminated safety glass, which comprises assembling a pair of sheets to be bent with a spacer sheet of heat absorbing glass between said pair of sheets and a bottom protecting sheet of heat absorbing glass beneath said pair of sheets, placing said assembled sheets upon a mold with the edge of the lowermost sheet in contact with the bending surface, prebending said sheets by heating to cause them to be softened and sink partially into the mold by gravity, and then applying suction intermittently to the prebent sheets to draw them downwardly into the mold and effect final bending thereof.

7. The process of bending glass sheets in pairs within a concave mold to produce a spherical type bend for subsequent assembly with a plastic interlayer to form a sheet of laminated safety glass, which comprises assembling a pair of sheets to be bent with a spacer sheet of heat absorbing glass between said pair of sheets and a bottom protecting sheet of heat absorbing glass beneath said pair of sheets, placing said assembled sheets upon a mold with the edge of the lowermost sheet in contact with the bending surface, prebending said sheets by heating to cause them to be softened and sink partially into the mold by gravity to seal the space beneath the sheets and to wedge said sheets together, and then applying a high suction to the space beneath the sheets for short periods at short regular intervals to draw said sheets downwardly as a unit and effect final bending thereof.

8. The process of producing compound spherical type bends within a mold, which comprises prebending a circular glass sheet by heat and gravity on a ring mold, cutting a section of the desired outline from said prebent sheet, placing said prebent cut section on a second mold, heating said section to cause it to be softened and sink partially into said second mold by gravity and then applying suction to said cut prebent section to draw it downwardly into the second mold and effect final bending thereof.

9. The process of producing compound spherical type bends within a mold which comprises prebending a stack of circular glass sheets by heat and gravity in a ring mold to wedge said sheets together, removing the prebent sheets from said ring mold and cutting a section of the desired outline from each, placing said prebent cut sections in superimposed relationship on a second mold, heating said sections to cause them to be softened and sink partially into said second mold by gravity to seal the space beneath the sections, and then applying suction to said sections to draw them downwardly into the second mold as a unit and effect final bending thereof.

10. The process of producing compound spherical type bends within a mold which comprises prebending a stack of circular glass sheets by heat and gravity in a ring mold to wedge said sheets together, removing the prebent sheets from said ring mold and cutting a section of the desired outline from each, placing said prebent cut sections in superimposed relationship on a second mold, heating said sections to cause them to be softened and sink partially into said second mold by gravity to seal the space beneath the sections, and then applying a high suction to the space beneath said sections for short periods at short regular intervals to draw said sections downwardly as a unit and effect final bending thereof.

CARL F. BINKERT.
JOSEPH E. JENDRISAK.